United States Patent [19]

Portas

[11] Patent Number: 5,589,123
[45] Date of Patent: Dec. 31, 1996

[54] PROCESS OF MAKING A TUBULAR SUPPORTING ELEMENT

[75] Inventor: Francesco Portas, Quattordio, Italy

[73] Assignee: Pirelli Cavi S.p.A., Milan, Italy

[21] Appl. No.: 411,421

[22] Filed: Mar. 27, 1995

Related U.S. Application Data

[62] Division of Ser. No. 351,878, Dec. 8, 1994, which is a continuation of Ser. No. 985,182, Dec. 2, 1992, abandoned.

[30] Foreign Application Priority Data

Dec. 16, 1991 [IT] Italy .................... MI91A3362

[51] Int. Cl.$^6$ ................................. B29C 67/00
[52] U.S. Cl. .................... 264/154; 264/162; 264/163
[58] Field of Search ................... 264/154, 162, 264/163

[56] References Cited

U.S. PATENT DOCUMENTS

| | | | |
|---|---|---|---|
| 3,515,798 | 6/1970 | Sievert ........................... | 174/135 |
| 4,179,320 | 12/1979 | Midgley et al. .................... | 156/86 |
| 4,389,440 | 6/1983 | Keith ............................. | 428/34.9 |
| 4,503,105 | 3/1985 | Tomioka .......................... | 428/36.9 |
| 5,087,492 | 2/1992 | Vallauri et al. ................... | 428/34.9 |

FOREIGN PATENT DOCUMENTS

| | | |
|---|---|---|
| 117092 | 8/1984 | European Pat. Off. . |
| 291203 | 11/1988 | European Pat. Off. . |
| 399263 | 11/1990 | European Pat. Off. . |
| 1292608 | 10/1972 | United Kingdom . |

OTHER PUBLICATIONS

EPO Search Reports (May 7, 1992 and Mar. 26, 1993).

*Primary Examiner*—Leo B. Tentoni
*Attorney, Agent, or Firm*—Brooks Haidt Haffner & Delahunty

[57] ABSTRACT

There is proposed a tubular supporting element of a sleeve for covering a junction of cables provided with a wall that has a non-passing incision directed according to a helical line, having a mouth with a width of less than 0.1 mm, preferably less than 0.05 mm, so as to accomplish a strip having a substantially rectangular cross-section; a process and an apparatus for accomplishing the abovementioned tubular element have also been developed.

6 Claims, 6 Drawing Sheets

PROCESS OF MAKING A TUBULAR SUPPORTING ELEMENT

This application is a division of application Ser. No. 08/351,878, filed on Dec. 8, 1994, which in turn is a continuation of application Ser. No. 07/985,182, filed on Dec. 2, 1992, now abandoned.

BACKGROUND OF THE INVENTION

The present invention relates to a tubular supporting element for a sleeve for covering junctions, particularly for cables for transmitting electrical energy, and process and apparatus for the accomplishment of the abovementioned tubular supporting element.

In order to execute the junction of cables for the transmission of electrical energy at medium and high voltages (higher than 10 KV), the extremities to be joined are deprived of the protection and insulation sheaths, so as to expose the electrical conductors and to make it possible to join them by means of welding or by means of clamping terminals; the junction area is then coated with suitable materials, such as putties, self-amalgamating tapes and such like, and over the extremities of the cables there is fitted a cover sleeve in elastomeric material, which has the functions of protecting and insulating the junction.

Covering sleeves are also applied to tubes, bars and such like, to obtain local protection against corrosion or for other purposes.

In order to fit a covering sleeve over a junction of electrical cables it has been proposed to arrange it over tubular elements of rigid plastic materials, capable of keeping it under conditions of elastic expansion.

The tubular element is fitted over the extremity of one cable before the junction is executed and, once the connection between the conductors has been made, it is removed by slipping it off the sleeve, which in this way can contract elastically and tighten itself over the cables at the junction.

Different forms of embodiments have been proposed to facilitate the operation of extracting the tubular supporting element.

In the English patent No. 1,292,608 there is described a hollow nucleus for supporting an elastic sleeve, formed by a pipe in plastic material having a deep helical groove on its external surface; there is thus defined a strip wound like a helix with the adjacent turns interconnected by a thin cordon which forms a preferential line of breakage and allows the separation of the turns, pulling one extremity of the strip; in this way the pipe is removed in the form of a continuous thin strip, allowing the sleeve to contract over the cables.

The U.S. Pat. No. 4,389,440 describes a hollow nucleus for supporting an elastic sleeve, formed by a tape in plastic material wound in a spiral, having thinned-out edges, constrained at certain points so as to form a substantially rigid pipe, that can collapse and be removed to allow the abovementioned sleeve to be fitted.

The U.S. Pat. No. 4,503,105 relates to a tubular nucleus formed by a plastic pipe whose wall is provided with internal ribs, axially directed and distanced in a circumferential direction, and is externally cut along a helical line, so as to form a continuous helically-wound strip, held together by the axial ribs.

The European patent application No. 0,291,203 describes a helical support obtained from a tubular casing in whose walls passing notches arranged along the helical line have

2 been cut, distanced in a circumferential direction and staggered, so as to leave in-between the notches themselves connection areas of resistance such as to allow the helical support to be undone manually, by pulling on an extremity; the incisions are made by means of a tool constituted by a toothed cutting wheel.

When the helical support is obtained from a tubular casing with a helical incision, accomplished with tools operating by the removal of chips, the width of the incisions themselves is at least equal to the thickness of the tool.

With tubular supporting elements of the type described in the abovementioned patents, provided with external helical incisions, deformations of the internal wall of the sleeve made of elastomeric material are inevitable, and this can lead to serious drawbacks.

In fact the fitting of the sleeve over the tubular supporting element is executed during the manufacturing stage, and thus the sleeve and the tubular supporting element remain engaged for a long period of time before the tubular supporting element is removed to execute the fitting of the sleeve over a junction of electrical cables.

It thus occurs that the sleeve, mounted onto the tubular supporting element under conditions of high elastic expansion, exerts on this a strong centripetal compression, which, in the presence of the discontinuities, such as incisions or notches, in the wall of the tubular element itself, leads the sleeve material to insinuate itself inside the incisions or inside the notches, with consequent deformations of its internal wall.

It so happens that these deformations are not completely eliminated in the short time span between the removal of the tubular supporting element and the contraction of the sleeve round the electrical cables of a junction. In fact the materials that are suitable for accomplishing elastic sleeves for junctions of electrical cables, after remaining in conditions of elastic deformation for a certain period of time, exhibit a certain value of residual deformation which, at room temperature, can only be recovered after a few hours or days.

Thus, between the internal wall of the sleeve, which remains deformed, and the external surface of the insulation of the cables, inclusions of air are formed, with highly detrimental consequences, since, when air ionises in the presence of the strong electrical fields existing in the junction during use, can produce partial discharges, of an intensity equal to several tens or hundreds of picoCoulombs, which jeopardise the functionality of the sleeve and of the junction as a whole.

In the Italian patent application No. MI 91 A 001416, filed on 23 May 1991 in the name of the same Applicant, there is described a tubular supporting element of a sleeve made of elastomeric material, having a smooth and continuous external wall and provided with a helical groove, with a substantially triangular or trapeze-shaped cross-section, obtained on its internal wall.

This solution, which allows the external surface of the tubular support to be smooth, reduces the resistant cross-section of the tubular casing itself, with respect to the condition of the integral pipe, limiting the pressure that it can sustain for a given wall thickness.

SUMMARY OF THE INVENTION

According to the present invention a tubular supporting element of a sleeve for covering junctions has been found, provided with a wall that has at least one non-passing incision directed according to a helical line suitable for defining a strip wound like a helix with adjacent turns interconnected by a thin cordon also wound like a helix, characterised in that said incision has a thickness of less than 0.1 mm, and preferably less than 0.05 mm, at the mouth of the tubular casing's surface.

According to another embodiment the present invention relates to a process for accomplishing a tubular supporting element of a sleeve for covering junctions, provided with a wall that has at least one non-passing incision directed according to helical line, characterised in that it comprises the steps of constraining the abovementioned tubular element to means of support under conditions of substantial axial containment and executes the abovementioned incision by a process involving the removal of chips.

According to a further embodiment, the present invention provides for an apparatus suitable for accomplishing a tubular supporting element of a sleeve for covering junctions, provided with a wall that has at least one non-passing incision directed according to helical line, comprising means for supporting the abovementioned tubular element and cutting means suitable for making the aforesaid incision by the removal of chips in the abovementioned wall, characterised in that said means of support sustain said tubular element under conditions of axial containment and said cutting means have a thickness that is substantially greater that said width of the incision, preferably not less than 0.5 mm.

With this solution it is possible to obtain a tubular supporting element of a covering sleeve that has the wall in contact with the abovementioned sleeve that is in practice smooth, even with a helical incision made on the same contact wall, and a resistant cross-section of each turn that is substantially rectangular capable of supporting comparatively high loads of centripetal compression, substantially similar to that of the integral tubular casing.

BRIEF DESCRIPTION OF THE DRAWINGS

Features and advantages of the invention shall now be illustrated with reference to preferred embodiments represented as non-limiting examples in the enclosed drawings, wherein.

Figure 1:
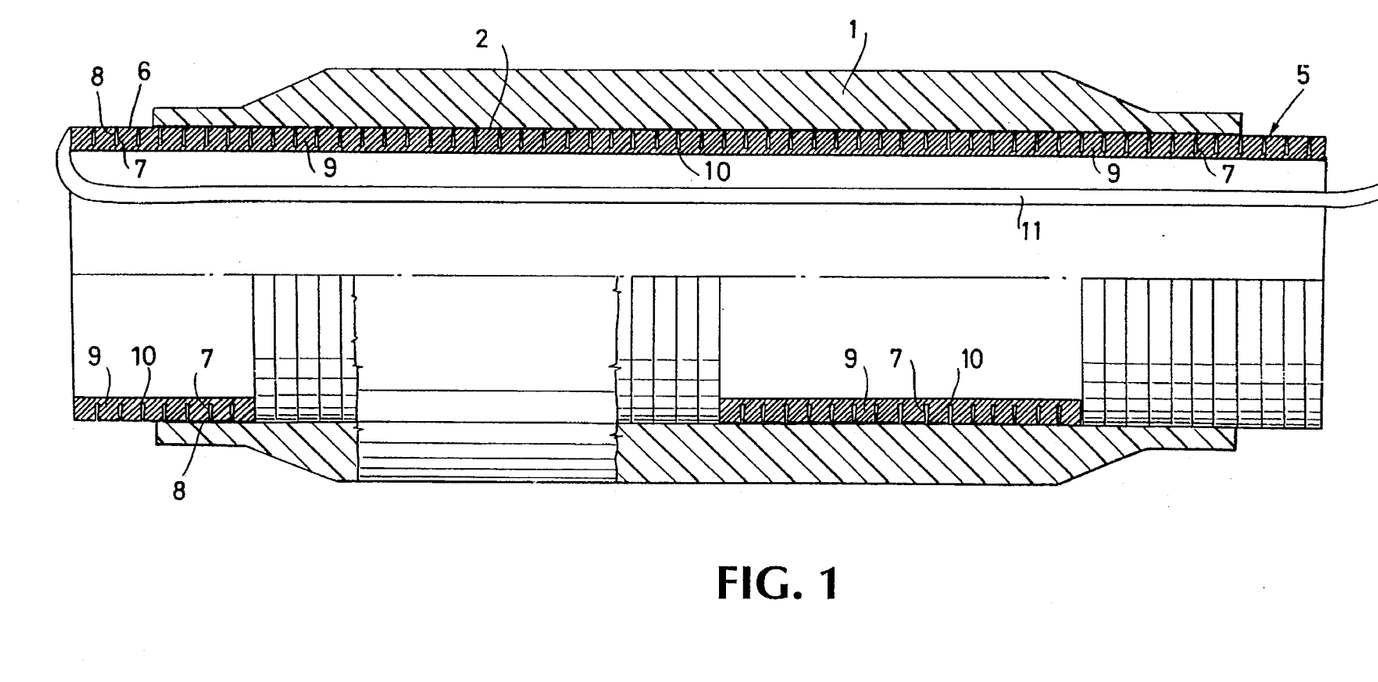
FIG. 1 is a view in partial axial cross-section of a sleeve for covering a junction between electrical cables and of a tubular supporting element accomplished according to the invention.
Figure 2:
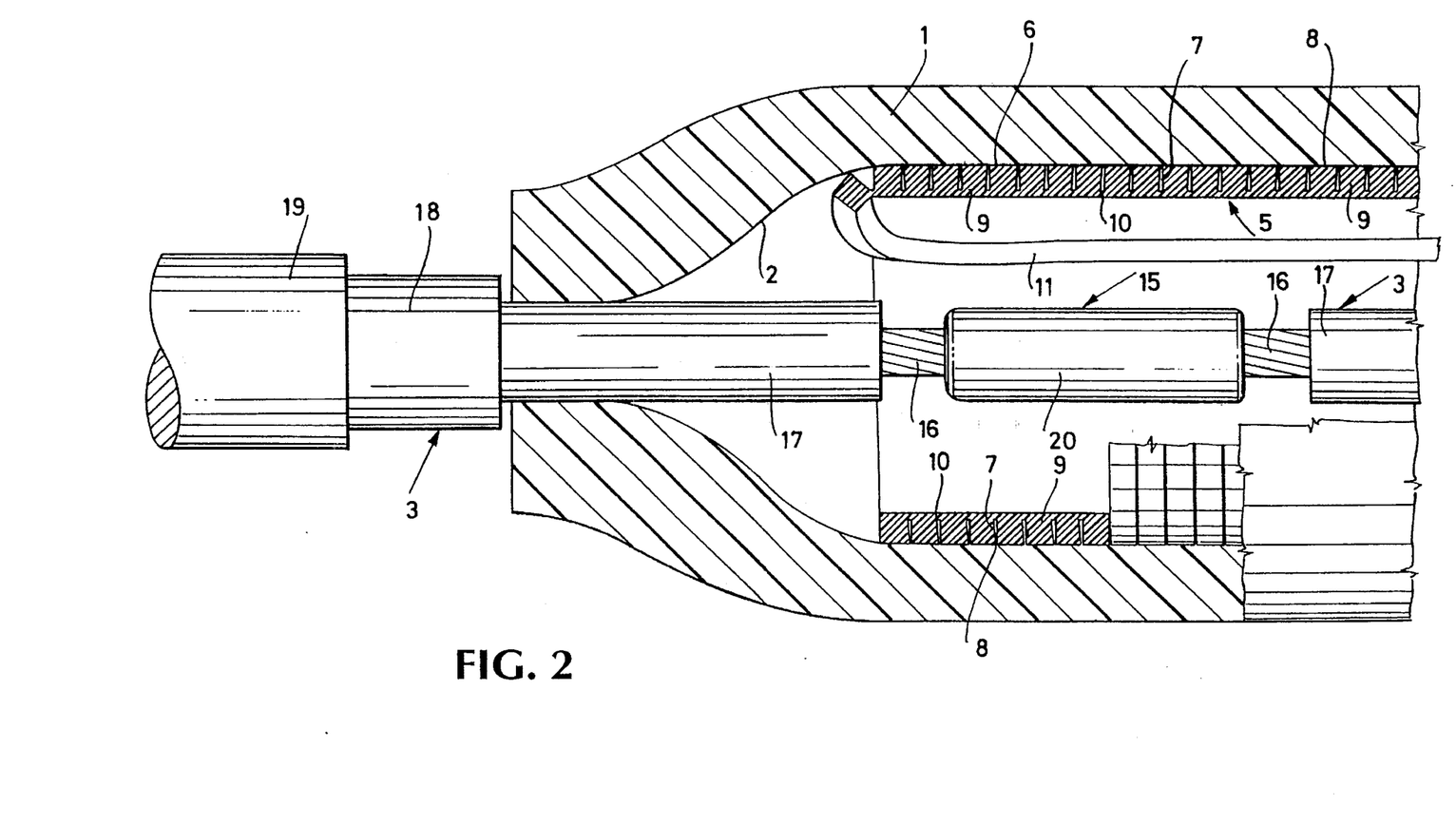
FIG. 2 is a partial view in axial cross-section of a junction between electrical cables using the covering sleeve and the tubular supporting element of FIG. 1, represented on an enlarged scale.

There is indicated in FIG. 1 with 1 a covering sleeve in elastomeric material having an internal wall 2, the sleeve 1 has functions of protection and insulation of a junction between two electrical cables, indicated as a whole with 3 in FIG. 2, for the transmission of electrical energy at medium or high voltages; there is indicated as a whole with 5 a tubular supporting element over which the sleeve 1 is fitted under condition of elastic expansion, of the order of 100% for junctions of high-voltage cables and of the order of 200%–300% for junctions of medium-voltage cables.

Figure 7:
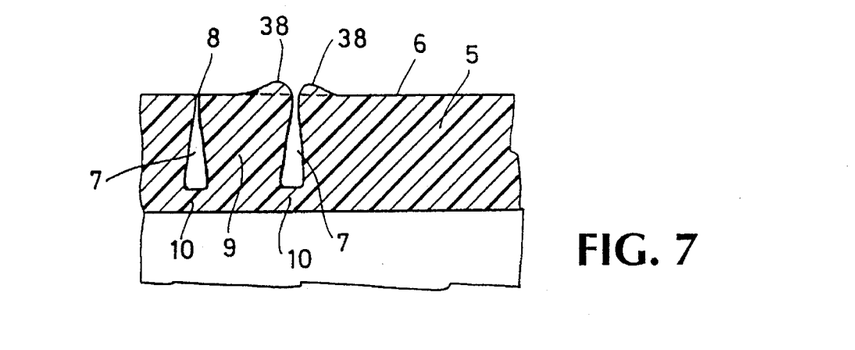
FIG. 7 is an enlarged view in partial cross-section of the tubular supporting element of FIGS. 5 and 6.

The tubular element 5 has an external wall 6 provided with a non-passing incision 7 directed along a helical line, which at its mouth 8 on the surface of the tubular element has a reduced width, less than 0.1 mm, and preferably less than 0.05 mm; as also shown in FIG. 7, such incision accomplishes a strip 9 with a substantially rectangular cross-section, wound like a helix with adjacent turns interconnected by an internal cordon 10 having a reduced thickness, that is also wound according to the abovementioned helical line, that constitutes a preferential line of breakage; there is indicated with 11 an extension of the strip 9, which extends outside the tubular element 5.

The tubular element 5 is made of plastic material such as PVC (polyvinylchloride), polyolefines, polyamides and such like. Since the incision 7 has a mouth 8 with an extremely limited width, the external wall 6 of the tubular element 5 is in practice smooth and thus the wall 2 of the sleeve 1 undergoes no deformation even though it may remain engaged with the wall 6 for a long period of time before the same sleeve 1 is applied to a junction of electrical cables; the tubular element 5, being formed by the strip 9 with a substantially rectangular cross-section, has a resistant cross-section suitable for supporting the considerable centripetal compression exerted by the sleeve 1, that can be of the order of 1 MPa, that is, a resistant cross-section substantially equal to, or only slightly less than, the resistance of the integral tubular casing, that is, having no incision 7.

There is illustrated in FIG. 2 the assembly diagramme of the sleeve 1, with the help of the tubular element 5, on a junction, indicated as a whole with 15 between the electrical cables 3.

The cables 3 comprise respective conductors 16 covered with insulators 17, with capacitative shields 18 and with external protective sheaths 19; after the set consisting of the tubular supporting element 5 and of the sleeve 1 has been fitted over the cable 3, in the junction area the extremities of the cables 3 are deprived, one after the other, of their respective protection and insulation coverings, so as to lay bare the respective conductors 16 and to connect them together through a terminal 20; round the junction 15 there is added a suitable filling material, not shown, such as putty in the paste state or self-amalgamating tapes and the junction 15 is then covered again with the sleeve 1.

When traction is exerted on the extension 11, the first turn of the strip 9 becomes separated from the tubular element 5 and turns are in this way progressively detached due to the effect of the tearing of the cordon 10 having reduced thickness, so that the tubular element 5 itself, while it is being undone, is removed and the sleeve progressively contracts over the cables 3 so as to restore conditions suitable for the proper operation of the cables.

The contraction of the sleeve 1 exerts an auxiliary force on the turn being pulled through the extension 11 and facilitates the collapse of the tubular element 5.

Figure 3:
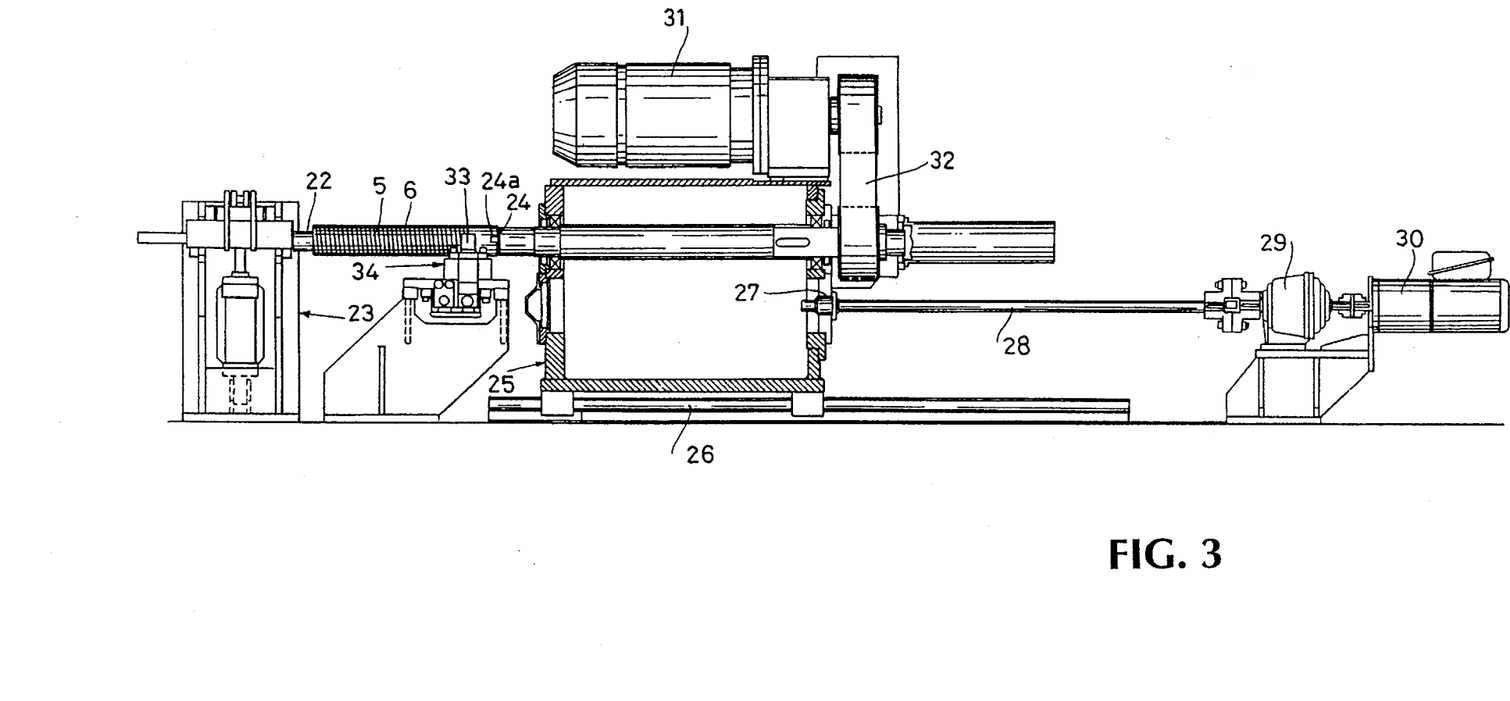
FIG. 3 is a front view, in partial cross-section, of an apparatus for the accomplishment of the tubular supporting element of FIG. 1.
Figure 4:
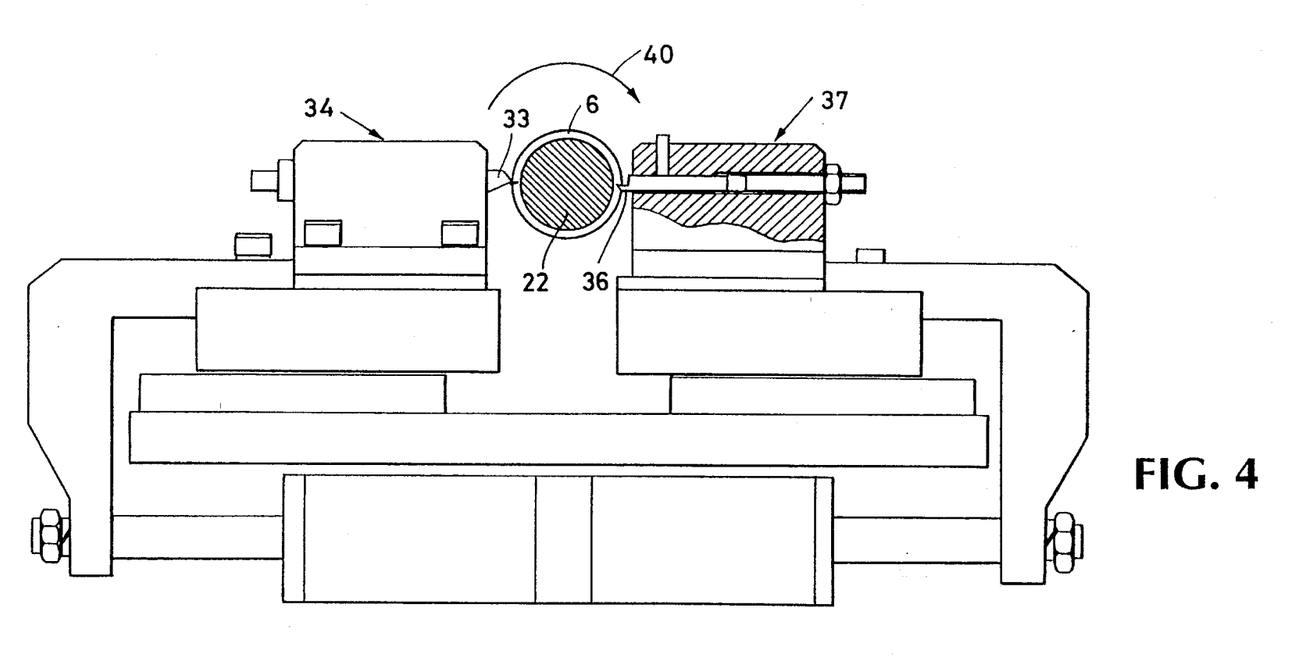
FIG. 4 is an enlarged lateral view of a supporting chuck, of a tubular supporting element and of tools of the apparatus of FIG. 3.
Figure 6:
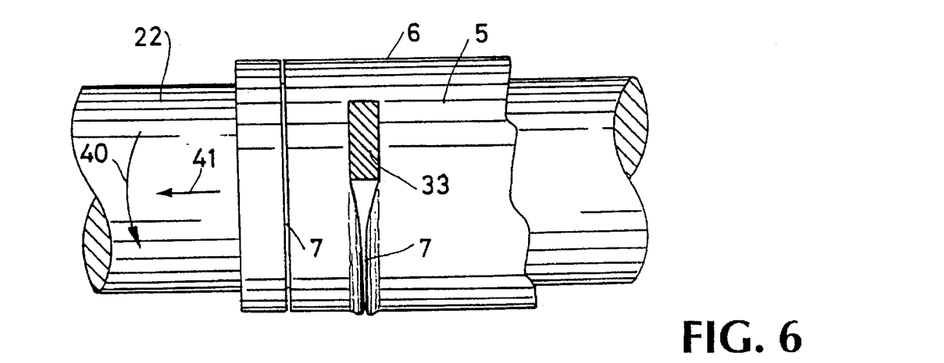
FIG. 6 is a side view, in partial cross-section, of the supporting chuck, of a tubular supporting element and of a tool of FIG. 5.

There is indicated in FIG. 3 with 22 a supporting chuck that is rotatable and axially displaceable, as indicated by the arrows 40 and 41 of FIGS. 4 and 6, over which it is fitted under conditions of radial interference, against a shoulder 24, which conveniently has a tooth 24a suitable for transmitting the rotation to a tubular element 5 being processed; the chuck 22 is rotatably supported in a fixed supporting structure, indicated as a whole with 23 and in a slidable supporting structure, indicated as a whole with 25, mounted on guides 26 and operated, by means of a transmission comprising a screw having helical teeth and balls 27, a worm gear with balls 28 and a gear reduction unit 29, an electric motor 30, the chuck 22 is operated in rotation by an electric motor 31, through a transmission 82.

Figure 5:
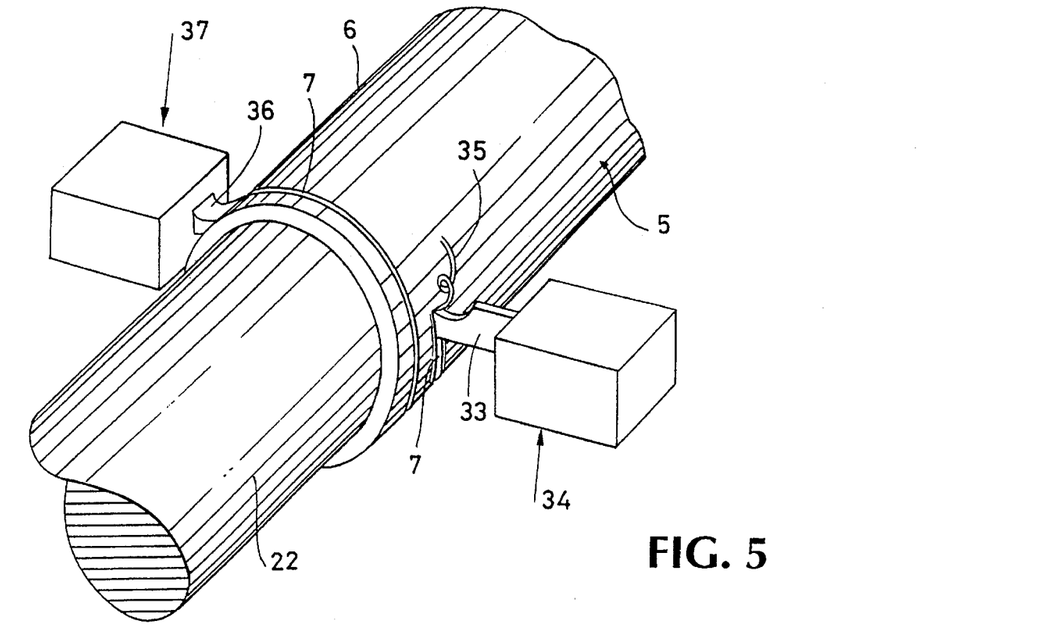
FIG. 5 is a partial perspective view of a supporting chuck, of a tubular supporting element and of tools of the apparatus of FIG. 3.

There is indicated with 33 a mechanical processing tool for the removal of chips, also visible in FIGS. 4, 5, 6, held in a supporting structure 34, provided with a cutting blade having a thickness ranging from 0.8 to 1 mm, suitable for making in the external wall 6 of the tubular element 5 the helical incision 7 by means of the removal of chips 35, as shown in FIG. 5.

There is indicated with 36 a shaving tool, also shown in FIGS. 4 and 5, held in a supporting structure 37, that is used to remove from the wall 6 the crests of material, indicated with 38 in FIG. 7, that are formed at the sides of the mouth 8 of the incision 7, during the processing of the tool 33.

In order to proceed with the incision of the tubular element 5 with the incision width indicated above, this is fitted over the chuck 22 under conditions of radial interference, such as to substantially prevent the longitudinal (or axial) expansion of the tubular element 5 while the above-mentioned incision 7 is made; the interference, for example, ranges from 0.2% to 0.5% of the internal diameter of the tubular element itself with materials having a coefficient of elasticity E=800 to 1000 MPa, so that, due to the friction between the tubular element and the chuck that supports it, there is accomplished an axial containment of the tubular element itself.

The helical incision 7 is made by the tool 33, while the chuck 22 is operated by the motors 30 and 31 in rotation and translation, operating at room temperature, so that the material heated by friction flows outwards and goes to partly fill the incision 7 in the proximity of the mouth 8, the crests 38 that are formed are then removed by the shaver 36.

It has been noted that with the apparatus and the method described it is possible to obtain a tubular element 5 formed by a strip 9 having with a substantially rectangular, or square, resistant cross-section that is especially strong, wherein the incision 7 has a width at the surface of the tubular element that is less than 0.1 mm, possibly even less than 0.05 mm, in relation to the magnitude of the containment accomplished.

After the removal, if any, of the crests 38, by means of the shaving tool 36, the external surface of the tubular element 5 is in practice smooth and causes no deformation of the internal wall 2 of the sleeve 1.

With the apparatus and process indicated above it is possible to accomplish tubular supports suitable for holding elastic sleeves of the type described using commercial extruded pipes, without requiring for them particular qualitative prescriptions, such as, for example, polypropylene pipes according to DIN 8077 specifications.

In fact, on the basis of such specifications, extruded pipes can have a wall thickness tolerance up to 0.1 s+0.2 mm, where s is the nominal thickness of the wall, due, for example, to the ovalisation of the pipe or to the eccentricity of the external and internal surfaces.

Under such conditions, operating according to the invention it is in any case possible to ensure a constancy of the thickness in the connecting area 10 between the turns, since the forced assembly of the tubular element 5 being processed on the chuck 22 forces its internal surface to match perfectly the surface of the chuck itself, which being made preferably of metal, can be manufactured with the necessary dimensional accuracy.

The tool 33 can then be arranged in an accurate position with respect to the chuck surface and thus the thickness of the area 10 is kept constant with a high degree of accuracy, without the possible eccentricity or ovalisation of the starting pipe having an appreciable influence.

On the basis of what has been described above, a tubular support for elastic sleeves has been accomplished starting from a commercial pipe made of polypropylene, having internal diameter of 45 mm and external diameter of 51 mm; the support had a useful length, after eliminating the initial and final processing extremities, of some 50 cm.

The starting pipe, about 60 cm long, has been forcibly introduced on a chuck 22 having a diameter of 45.2 mm.

The processing tool had a thickness of 0.8 mm and, during processing, it penetrated into the thickness of the wall of the pipe leaving a residual thickness of 0.5 mm.

Under these conditions a tubular support has been obtained wherein the width of the helical incision, at the external surface, has been measured to range from 0.05 mm to zero, meaning by this that in some areas the sides of the incision were locked together, making it impossible to introduce a feeler gauge into the incision itself.

With the same tool, but operating in the absence of force on the tubular element, which has been processed by keeping it supported on a chuck having a diameter of 45.0 mm, a length of incision has been obtained that is substantially equal to the thickness of the tool used.

It is believed that the result obtained is due to the fact that, in the presence of a forced assembly of the pipe on the chuck, a force is generated by friction between the chuck and the pipe that opposes a longitudinal extension of the pipe itself during processing, that is, the pipe is in a state of containment of its axial extension.

This means that, since an axial extension is inhibited, in order to leave space for the tool that penetrates into the thickness of the wall of the pipe to accomplish the incision, the material is elastically compressed round the tool, returning elastically to the previous dimension after the passage of the tool, so that the material removed by the tool while executing the incision, is in fact less than would correspond to a groove equal to the actual thickness of the tool.

Figure 8:
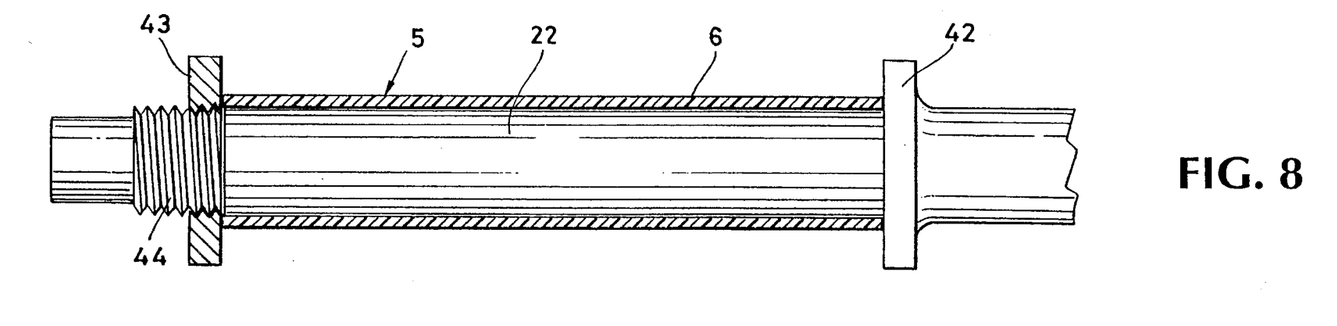
FIG. 8 is a variant of the supporting chuck of FIGS. 5 and 6.

As an alternative, it is possible to accomplish the invention with an apparatus of the type illustrated earlier, but making use of a chuck as indicated in FIG. 8.

On such a chuck the tubular element 5 is fitted without any interference (but preferably in the substantial absence of radial clearance), and is moved in abutment against a fixed shoulder 42, similar to the shoulder 24 described earlier.

On the opposite side, the tubular element is axially constrained by a mobile shoulder 43, moved in abutment and held tightly against the tubular element 5 through screw means 44 or similar members.

In such an embodiment, as in the previous case, any extension of the tubular element 5 is substantially inhibited during processing with the tool 33, so as to determine an incision having minimum or zero width.

Figure 9:
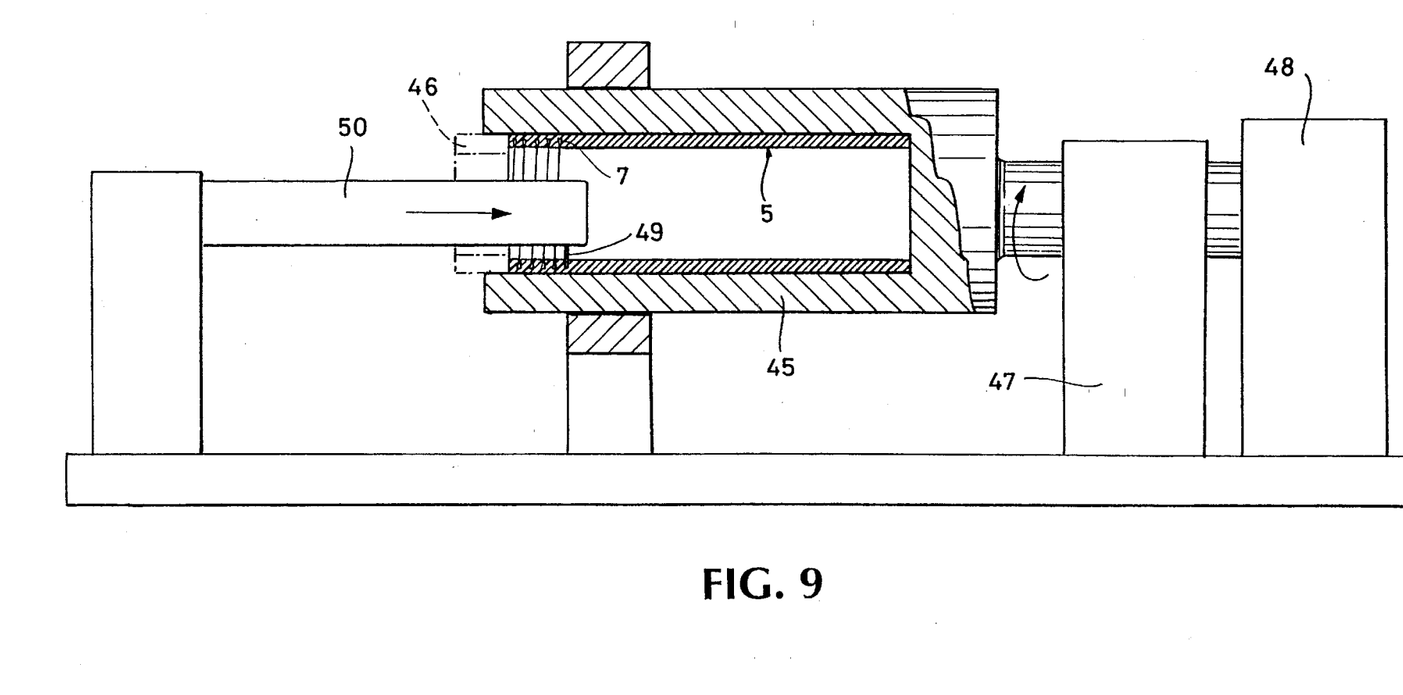
FIG. 9 is a diagrammatic view of another embodiment of the invention.

According to a further alternative, illustrated in a highly diagrammatic form in FIG. 9, it is possible to accomplish a tubular support with an internal incision, while still, on the other hand, maintaining a width of the incision less than the thickness of the tool, so as to reduce to a minimum the weakening of the tubular element due to the incision.

This can be particularly useful in the case where requirements of smoothness of the surface of the tubular element in contact with the sleeve are particularly severe, for example, in uses in the field of high voltages.

To this end the tubular element 5 can be held inside a supporting member 45, under conditions of axial containment, by friction, that is, by insertion with radial interference, or with a locking shoulder 46, indicated in the figure with dotted lines.

The supporting member 45, rotatably supported by a base 47, is rotated by a motor unit 48.

A tool 49, supported by a tool holder 50, makes the incision of the tubular element, with a relative axial movement with respect to the supporting member 45.

While, under such conditions, further processing of the internal surface of the tubular element is not necessary, a subsequent processing of the external surface of the tubular element may be appropriate, after it has been removed from the supporting member 45, for example, by means of a tool similar to the shaving tool 36 described earlier, so as to obtain the required characteristics of surface smoothness.

I claim:

1. Process for making a tubular supporting element for a sleeve for covering junctions of cables, the supporting element comprising a tubular body with a wall of a predetermined radial thickness having at least one reverse V-shaped helical incision therein with a radial dimension less than said predetermined thickness and with an outer surface and an inner surface coaxial with the axis of said body, said outer surface being engageable with an inner surface of said sleeve, comprising the steps of:

constraining the supporting element to a supporting means under conditions of substantial axial containment and helically making at least one reverse V-shaped incision in said wall, which is continuous circumferentially of said axis, by means of a cutting blade in condition of axial containment of said supporting element, wherein said incision separates portions of said wall from each other so as to define a strip between one turn of the incision and the next turn of the incision which strip thereby extends helically around said axis, said incision extends radially of said axis either from said outer surface of said tubular body toward said inner surface of said tubular body or from said inner surface of said tubular body toward said outer surface of said tubular body, and said incision has a reverse V-shaped cross-section having a mouth at said outer or inner surface and a width at said radial portion, said mouth having a width transverse to the helical length of said incision which is not greater than the said width at said radial portion.

2. The process of claim 1, wherein said incision is made substantially at room temperature.

3. Process for making a tubular supporting element for a sleeve for covering junctions of cables, the supporting element comprising a tubular body with a wall of a predetermined radial thickness having at least one reverse V-shaped helical incision therein with a radial dimension less than said predetermined thickness and with an outer surface and an inner surface coaxial with the axis of said body, said outer surface being engageable with an inner surface of said sleeve, comprising the steps of:

constraining the supporting element to a supporting means under conditions of substantial axial containment, helically making at least one reverse V-shaped incision in said wall, which is continuous circumferentially of said axis, by means of a cutting blade in condition of axial containment of said supporting element, and smoothing the external wall of the tubular support, wherein said incision separates portions of said wall from each other so as to define a strip between one turn of the incision and the next turn of the incision which strip thereby extends helically around said axis, said incision extends radially of said axis either from said outer surface of said tubular body toward said inner surface of said tubular body or from said inner surface of said tubular body toward said outer surface of said tubular body, and said incision has a reverse V-shaped cross-section having a mouth at said outer or inner surface and a width at said radial portion, said mouth having a width transverse to the helical length of said incision which is not greater than the said width at said radial portion.

4. The process of claim 3 wherein said smoothing is simultaneous with the step of executing said incision.

5. A process of making a tubular element for supporting an elastic sleeve for covering junctions of cables, where said tubular element has a wall of predetermined radial thickness and at least one helical incision therein which defines a helical detachable strip in said wall, said helical incision having a radial dimension less than said predetermined thickness, comprising:

making said helical incision in said tubular element by means of a process for the removal of chips while constraining said tubular element to a supporting means under conditions of substantial axial containment, whereby said helical incision is obtained with a reverse V-shaped cross-section and a mouth less than about 0.1 mm.

6. A process of making a tubular element for supporting an elastic sleeve for covering junctions of cables, where said tubular element has a wall of predetermined radial thickness and at least one helical incision therein which defines a helical detachable strip in said wall, said helical incision having a radial dimension less than said predetermined thickness, comprising:

making said helical incision in said tubular element by means of a process for the removal of chips using cutting means having a thickness ranging from 0.8 mm to 1 mm while constraining said tubular element to a supporting means under conditions of substantial axial containment, whereby said helical incision is obtained with a reverse V-shaped cross-section and a mouth less than about 0.1 mm.

* * * * *